United States Patent Office 3,383,306
Patented May 14, 1968

3,383,306
HYDRODENITRIFICATION WITH VANADIA-ALUMINA CATALYST SUPPORT
Edward S. Rogers, Hinsdale, Ill., and Stephen M. Kovach, Highland, Ind., assignors to Sinclair Research, Inc., New York, N.Y., a corporation of Delaware
No Drawing. Filed Nov. 16, 1965, Ser. No. 508,130
10 Claims. (Cl. 208—254)

This invention relates to the upgrading through hydrorefining of mineral oil hydrocarbon fractions with the use of a promoted vanadia-alumina support having been prepared by coprecipitation.

The presence of sulfur and nitrogen in mineral hydrocarbon oils has long been recognized as undesirable. Nitrogen compounds have a poisoning effect as they often tend to reduce or destroy the activity of catalysts employed to convert, e.g. crack, these stocks. The higher the nitrogen content of the charge stock, the higher will be the temperature required to effect a given amount of conversion, eventually requiring more frequent regeneration or replacement of the catalyst. Sulfur compounds are highly objectionable in hydrocarbon oils as they have an unpleasant odor, tend to cause corrosion and often lead to sludging. These difficulties have led to various proposals for desulfurization and denitrogenation of almost all petroleum, coal tar and shale oil hydrocarbon fractions which are normally liquid or which can be made fluid at treating temperature, including light distillates, middle and heavy distillates and even residual stocks. For instance, prior methods have included acid treatment, deasphalting and, more particularly, hydrogenolysis in contact with a catalytic material such as molybdenum sulfide, tungsten oxide, nickel sulfide, tungsten sulfide, cobalt molybdate, nickel molybdate, etc. This latter hydrogenation treatment has become commonly known as hydrorefining or hydrofining. The hydrogenation catalysts selected for use in these hydrorefining or "upgrading" treatments may vary with the particular hydrocarbon stock to be treated, i.e., according to its nitrogen and sulfur content, its olefinic and aromatic content, etc. These catalysts may be classified according to their hydrogenation and denitrogenation activities, "hydrogenation activity" referring primarily to the ability of the catalyst to effect hydrogenation of the unsaturated hydrocarbons present in the feed and "denitrogenation activity" referring to the catalyst's ability to effect conversion of the nitrogen contaminants to ammonia. Currently more and more hydrocarbon stocks with high nitrogen content are being used and, consequently, catalysts having high denitrogenation activities are being sought for the hydrorefining treatment prior to the hydrocracking or chemical conversion process. A conventionally employed catalyst for this purpose is cobalt molybdate-on-alumina, a highly active denitrogenation catalyst widely employed in the industry.

Ordinarily in catalytic hydrorefining it is desirable to employ a catalyst which has a high hydrogenation activity towards the olefins, aromatics, etc., of the feedstock as well as a high denitrogenation activity. The aforementioned cobalt molybdate-on-alumina catalyst possesses a relatively high hydrogenation activity as well as a high denitrogenation activity. In certain circumstances, however, it becomes necessary to employ a low hydrogenation catalyst in the hydrorefining process, for example, when hydrogenolysis of impurities is desired without saturation of the hydrocarbons in the feed. In these cases the standard cobalt molybdate-on-alumina catalyst will not suffice and an entirely different catalyst must be used. Since the support components of the commonly employed hydrogenation catalysts contribute significantly to the hydrogenation and denitrogenation activities of the catalysts, by and large it has not been considered feasible to vastly alter one or the other activities of the catalyst simply by varying promoters on the same support. It would, however, be most advantageous if one support were available which could serve as a carrier for catalysts covering a wide range of hydrogenation activities yet having consistently high denitrogenation activities. If the hydrogenation activities could be drastically varied simply by use of different promoters, instead of having to stock a variety of different catalyst supports to meet all the different needs, it would only be necessary to have on hand one support material which could then be easily and simply impregnated with the suitable promoter.

We have found that a catalyst having as its support a coprecipitate of vanadia and alumina can have consistently high denitrogenation activity with hydrogenation activity within a wide range depending on which promoters are added. Suitable as promoters are the metals, ether as free metals or in combined form, e.g. as oxides or sulfides, of Group VI–B (periods V and VI), Group VII–B and the iron series of Group VIII of the Periodic Table, having atomic numbers from 25 to 75, inclusive, that is, Mo, W, Mn, Tc, Re, Fe, Co and Ni.

Whereas the prior art, when employing compositions comprising vanadia and alumina as hydrogenation catalysts, has preferred to impregnate an alumina or alumina-silica support with vanadia, we have found that coprecipitates of alumina and vanadia when promoted with one of the above metals provide catalysts of substantially greater denitrogenation activity than do the impregnates. An additional disadvantage of the previously preferred technique is that the low solubility of the preferred vanadium salts for such impregnation, i.e., those containing no ion detrimental to catalyst activity, makes multiple impregnations, or the use of expensive chelating agents necessary.

The coprecipitation may be performed by various techniques. For example, an alkaline solution of sodium metavanadate in water may be reacted with an aqueous solution of aluminum chloride or other acidic aluminum salt. The resultant precipitate can then be washed to remove chloride, sodium or other ions. Calcination or activation of the precipitate, e.g. at about 700 to 1300° F., preferably 900 to 1050° F., converts the vanadium and aluminum to their oxide forms. The coprecipitated alumina-vanadia supports are usually characterized by a large surface area ranging from about 100 to 400 square meters per gram, preferably greater than about 150 m.²/g. as determined by the BET method. In addition to vanadia and alumina, there may be present in minor amounts in the catalyst support other of the inorganic oxides commonly employed as support ingredients in hydrogenation catalysts, e.g. boria, titania, silica, etc.

Addition of the promoters of the vanadia-alumina base may be accomplished by a variety of techniques such as digestion or hydrothermal treatment, impregnation and dry mixing. The support can be shaped prior to deposition of the promoter or promoters, e.g. by extrusion, pelleting, etc., or any shaping desired may be performed on the promoted catalyst. In accordance with the present invention the catalysts may often contain a catalytically effective amount of promoter, e.g. about 1 to 40 weight percent, preferably 3 to 12 percent and about 5 to 50 percent of vanadia, preferably 15 to 30 percent, the balance to consist essentially of alumina.

The catalysts of the present invention are particularly active when the activating metals are converted to their sulfides. The sulfiding step generally comprises passing hydrogen sulfide, either pure or diluted with another gas such as, for instance, hydrogen over a bed of the promoted catalyst at temperatures usually from about 300 to 1000 °F., preferably from 400 to 800 °F., for a time sufficient to convert a significant portion of the catalytic metals to their sulfides. Alternatively, the catalyst may be sulfided by the processing of a sulfur-containing feed. Air should be excluded from the catalyst after sulfiding.

The hydrorefining process of this invention generally involves contacting the feed with the catalyst, in the form of rough granules or a powder, or as compressed tablets, extruded pellets or the like, ranging in size from about $\frac{1}{32}''$ in diameter and from about $\frac{1}{16}''$ to $1''$ in length, in the presence of molecular hydrogen. Fixed or moving catalyst bed reactors may be used. The hydrogenation process may be conducted continuously or batchwise by methods well known in the art. The hydrogenation conditions may often include temperatures from about 300 to 800° F., preferably 500 to 700° F., pressures from about 0 to 3000 pounds per square inch gauge, preferably 100 to 2000 p.s.i.g.; a weight hourly space velocity, i.e., the weight of hydrocarbon feed processed per weight of catalyst per hour, of from about 0.1 to 10, preferably a WHSV of 0.5 to 5; and a molar ratio of hydrogen to hydrocarbon feed of about 1 to 20, preferably 1 to 10.

The following examples are cited to illustrate preparation of typical catalysts of the present invention.

Example I

Vanadia-alumina was prepared by coprecipitation as follows: 322 grams of $NH_4VO_3$ and 1780 g. NaOH were dissolved in sufficient deionized $H_2O$ to make 10 liters of solution. 3590 grams of $AlCl_3.6H_2O$ was dissolved in deionized $H_2O$ to make 10 liters of $AlCl_3$ solution. These two solutions were added at equal slow rates to a heel of 5 liters of deionized water. After the addition was complete, the pH of the slurry was adjusted to 6.5 with $(NH_4)_2CO_3$ solution, then the slurry was filtered, washed, and dried, then calcined 3 hrs. at 1050° F. The product analyzed as 23% $V_2O_5$ and was designated Sample A.

Example II

Vanadia-alumina was prepared by impregnation as follows: A calcined extruded alumina was impregnated six times with a solution of $V_2O_3$ in deionized water containing $HNO_3$ to maintain a pH of 3–4. The extrudate was dried at 240° F. after each impregnation, and finally calcined 3 hrs. at 1050° F. The product analyzed as 22.5% $V_2O_5$ and was designated Sample B.

Example III

A portion of Sample A was impregnated with an aqueous $Co(NO_3)_2$ solution to obtain 4% Co on the finished catalyst. It was then calcined for 3 hrs. at 900° F. and designated as Sample A–1.

Example IV

A second portion of Sample A was impregnated with a solution of $Ni(NO_3)_2$ in deionized water to obtain 4% Ni on the finished catalyst. It also was calcined for 3 hrs. at 900° F. and was designated Sample A–2.

Example V

A third portion of Sample A was impregnated with an aqueous ammoniacal solution of ammonium molybdate (pH 8.5) so as to obtain 12% $MoO_3$ on the finished catalyst; after drying and calcining 3 hrs. at 900° F., this catalyst was designated Sample A–3.

Example VI

A fourth portion of Sample A was impregnated with a solution of ammonium metatungstate in deionized water to obtain 18% $WO_3$ on the finished catalyst; it was then calcined for 3 hrs. at 900° F. This product was designated as Sample A–4.

Example VII

A fifth portion of Sample A was impregnated with rhenium heptoxide in deionized water containing sufficient HCl to obtain a pH of 3. The impregnating solution was of sufficient concentration to obtain 3% Re on the finished catalyst. The Re was fixed to the catalyst base by contact with $H_2S$ gas, 500% excess $H_2S$ over the amount required to form $Re_2S_7$ being used. The catalyst was then dried for 3 hrs. at 230° F., and was designated as Sample A–5.

Example VIII

A portion of Sample B (Example II) was impregnated with rhenium heptoxide by the method used in Example VII to obtain 3% Re on the finished catalyst. The Re was again fixed by use of 500% excess $H_2S$, and the catalyst dried for 3 hrs. at 230° F. The finished catalyst was designated as Sample B–2.

The above catalysts were tested in batch operation using a 300 cc. autoclave. In each case, 3.0 g. of catalyst powder was used in treating 95 ml. of 1 methyl naphthalene containing 100 p.p.m. nitrogen, as quinoline, at 600° F. under 1000 p.s.i.g. $H_2$. The refractive index of the sample feed prior to hydrogenation was 1.6180. In the tests reported here, the catalyst was in each case treated with $H_2S$ prior to admitting the $H_2$ and feed. The reaction was timed from the addition of the feed at 600° F. to the point when the refractive index of the product reached $n_D{}^{25}=1.5800$, or to such a time that a reasonable extrapolation could be made to determine the time required to reach that refractive index while still allowing meaningful nitrogen analysis. The refractive index was tested on 1 cc. samples bled from the reactor at 30–60 minute intervals. At the end of the reaction, $H_2$ and stirring were shut off, and the bomb cooled quickly. The product, after filtering to remove catalyst fines, was analyzed for total nitrogen (p.p.m.). To compare these catalysts, their hydrogenation activity, i.e., the average change in refractive index per minute ($\Delta\, n_D{}^{25}$ min. $\times 10^4$), and denitrogenation activity, i.e., the average decrease in nitrogen content per minute ($-\Delta$ p.p.m. N/min.), were calculated.

The activities of the catalysts so tested are reported in the following table:

| Catalyst | Catalyst Activities | |
| --- | --- | --- |
|  | $\Delta\, n_D{}^{25}$/min.$\times 10^4$ | $-\Delta$ p.p.m. N/min. |
| A | 0.48 | 0.371 |
| A–1 | 0.41 | 0.450 |
| A–2 | 0.51 | 0.467 |
| A–3 | 2.09 | 0.661 |
| A–4 | 0.1 | 0.375 |
| A–5 | 1.57 | 0.457 |
| B–2 | 1.35 | 0.444 |

For comparison purposes, the hydrogenation and denitrogenation activities of a standard commercial $CoMoO_4$ on $Al_2O_3$ hydrogenation catalyst on the same test was:

Catalyst _____ $CoMoO_4/Al_2O_3$
$\Delta\, n_D{}^{25}$ min. $\times 10^4$ _____ 1.10
$-\Delta$ p.p.m. N/min. _____ 0.298

Catalyst A is seen to be 1.25 times as active for denitrogenation as the base-line catalyst, while having less than half the hydrogenation activity. In addition, promotion of catalyst A with Co (A–1) and Ni (A–2) increases the denitrogenation activity without significantly changing the hydrogenation activity; while promotion of catalyst A with $WO_3$ (A–4) causes a significant decrease in hydrogenation activity, without significantly altering the denitrogenation activity. This can be of significance in reducing the consumption of hydrogen when hydrogenolysis of impurities is desired without saturation of the hydrocarbons in the feed.

For use in the case where saturation of the feedstock is desired in addition to hydrogenolysis of impurities, catalyst A–3 is 1.9 times as active as the baseline catalyst for hydrogenation and 22 times as active for denitrogenation. This is especially surprising because $MoO_3$ and $WO_3$ are expected to have similar effects on catalyst activity. This is an example of the unusual specificity of coprecipitated vanadia-alumina as a base material for various promoters.

Comparison of catalysts A-5 and B-2 shows the superiority of co-precipitated $V_2O_5$-$Al_2O_3$ over that of the same composition made by impregnation, the hydrogenation activity of the impregnated base being only 85% as great as that of the coprecipitated base. To a lesser extent, the coprecipitated $V_2O_5$-$Al_2O_3$ is superior in denitrogenation activity as well.

The hydrorefining process of the present invention, employing the vanadia-alumina supported catalyst, is useful for the removal of non-hydrocarbon, e.g., sulfur, oxygen and nitrogen, impurities and, optionally, for the hydrogenation of unsaturated, i.e., olefinic, aromatic, etc., hydrocarbons from a variety of petroleum, shale oil, tar sand and coal tar fractions for the production of chemicals, lubricating oils, fuels, etc. The process of the present invention can be used for treating mineral hydrocarbon stocks comprising base stocks for lubricants, lighter petroleum distillates such as a gas oil for catalytic cracking and hydrocracking, wax distillates from paraffin crudes, catalytically cracked distillates and the like.

We claim:

1. A process for hydrorefining a nitrogen-contaminated mineral oil hydrocarbon which comprises contacting said hydrocarbon with molecular hydrogen under hydrogenation conditions in the presence of a catalyst consisting essentially of a vanadia-alumina support containing about 5 to 50%, by weight of the catalyst, of vanadia and having been prepared by coprecipitation, and at least on promoter selected from the group consisting of the meta of Groups VI-B, VII-B and the iron series of Group VII of the Periodic Table having atomic numbers from 2 to 75, inclusive.

2. The process of claim 1 wherein said catalyst cor tains about 1 to 40 percent, by weight, of promoter.

3. The process of claim 1 wherein about 15 to 30 pei cent, by weight, of said catalyst is vanadia, about 3 to 1 percent, by weight, is promoter and the balance is es sentially alumina.

4. The process of claim 1 wherein the catalyst is sulfidec

5. The process of claim 1 wherein the catalyst con tains molybdena as a promoter.

6. The process of claim 3 wherein the catalyst contain molybdena as a promoter.

7. The process of claim 3 wherein the catalyst contain nickel as a promoter.

8. The process of claim 3 wherein the catalyst contain tungsten as a promoter.

9. The process of claim 3 wherein the catalyst contain rhenium as a promoter.

10. The process of claim 6 wherein the catalyst i sulfided.

References Cited

UNITED STATES PATENTS

| | | | |
|---|---|---|---|
| 2,785,141 | 3/1957 | Fleck | 252—46₄ |
| 3,152,091 | 10/1964 | Gring | 252—46₄ |
| 3,210,293 | 10/1965 | O'Hara | 252—46₄ |
| 3,269,958 | 8/1966 | Gatsis | 252—46₄ |

SAMUEL P. JONES, *Primary Examiner.*